US007259975B2

(12) United States Patent
Holme Pedersen et al.

(10) Patent No.: US 7,259,975 B2
(45) Date of Patent: Aug. 21, 2007

(54) POWER SUPPLY UNIT

(75) Inventors: Thomas Holme Pedersen, Frederiksberg (DK); Christian Kolind, Frederiksberg (DK)

(73) Assignees: Microlead Technology Ltd., Hong Kong (CN); Microlead International Limited, Totola (GB)

( * ) Notice: Subject to any disclaimer, the term of this patent is extended or adjusted under 35 U.S.C. 154(b) by 0 days.

(21) Appl. No.: 10/513,010

(22) PCT Filed: May 1, 2003

(86) PCT No.: PCT/DK03/00281

§ 371 (c)(1),
(2), (4) Date: Jul. 21, 2005

(87) PCT Pub. No.: WO03/094305

PCT Pub. Date: Nov. 13, 2003

(65) Prior Publication Data

US 2006/0044858 A1 Mar. 2, 2006

(30) Foreign Application Priority Data

May 1, 2002 (DK) .............................. 2002 00668

(51) Int. Cl.
*H02M 1/00* (2006.01)

(52) U.S. Cl. ...................................................... 363/146

(58) Field of Classification Search ................ 363/143, 363/144, 146, 147
See application file for complete search history.

(56) References Cited

U.S. PATENT DOCUMENTS

| | | | | |
|---|---|---|---|---|
| 4,273,406 A | | 6/1981 | Okagami | 339/147 |
| 4,856,999 A | * | 8/1989 | Flohr | 439/52 |
| 5,369,352 A | * | 11/1994 | Toepfer et al. | 320/110 |
| 6,267,627 B1 | | 7/2001 | Lin | 439/622 |
| 6,544,051 B1 | * | 4/2003 | Su | 439/131 |

FOREIGN PATENT DOCUMENTS

| | | |
|---|---|---|
| EP | 0 493 080 A2 | 7/1992 |
| EP | 0 531 687 A2 | 3/1993 |
| WO | WO94/06177 | 3/1994 |

* cited by examiner

*Primary Examiner*—Adolf Berhane
(74) *Attorney, Agent, or Firm*—Westman, Champlin & Kelly, P.A.

(57) ABSTRACT

A plug device with a built-in power supply of switch mode power supply type is disclosed. The plug device comprises a printed circuit board upon which a high-frequency transformer, a low-voltage capacitor and other components which make up a switch mode power supply are arranged. A first isolating barrier extends form the housing in between the high-frequency transformer and said low-voltage capacitor. A third isolating barrier extends form the housing and into a first slot in the printed circuit board and a fourth isolating barrier extends from said housing and into a second slot in the printed circuit board. These slots are placed between the high-voltage and low-voltage connection terminals of the high-frequency transformer. A second isolating barrier extends from said housing and between the high-frequency transformer and the printed circuit board and beneath said high-frequency transformer.

10 Claims, 7 Drawing Sheets

POWER SUPPLY UNIT

CROSS-REFERENCE TO RELATED APPLICATION

This Application is a Section 371 National Stage Application of International Application No. PCT/DK03/00281, filed May 1, 2003 and published as WO 03/094305 on Nov. 13, 2003, in English, the contents of which is hereby incorporated by reference in its entirety.

FIELD OF THE INVENTION

The invention relates to a plug device with an built-in power supply of a switch mode power supply type (SMPS type) or a power supply unit comprising a printed circuit board (PCB) upon which a high-frequency transformer, a low-voltage capacitor and other components are arranged, said device further comprising a housing and at least two input connectors adapted for insertion into a socket such as a wall socket.

All over the world different standards for electronic devices exist-though in some places the standards are considerably lower than in others-and AC/DC adapters must comply with these standards. One set of such standards are the IEC standards. IEC 60950 describes the minimum requirements for electrical equipment with regard to isolation and minimum distances between components with different voltage levels. IEC 61000 describes minimum requirements for electromagnetic compatibility (EMC). Usually, some standards are also set out for the shape of electric/electronic devices, In the case of plug devices, the standard EN 50075 is set out and applies to plug devices in the EU. In the following, the plug size will be referred to as a European type plug.

The plug device is of small physical dimensions, thus requiring special attention to the arrangement of components in order to comply with standards like the [IEC] standards. This is because the outer surface of capacitors usually is made from a metal like aluminium, which is fully or partially covered by some plastic or ceramic material. This material has insulating properties, but does not comply with any specific standards and thus the surface of the capacitor must be regarded as a conducting surface. This also applies to the core of the high-frequency transformer.

The core of a high-frequency transformer is usually made from a material like ferrite.

Ferrite has low electrical conductivity, however, it is not low enough to be regarded as an insulator. Thus, the core of the transformer must also be regarded as a conducting surface.

DESCRIPTION OF THE PRIOR ART

Over time there have been several inventions focused on integrating AC/DC adapters into the mains plug used for the mains power supply. These adapters are very useful because many electronic devices require a power supply with a low-voltage (typically, 3-15V) and a low power consumption (1-20 W). External power supplies are also a way of reducing the overall costs and thus the electronic device may have to be designed for use with only one voltage. The external power supply is then adapted to convert different voltages and frequencies to a specified DC voltage. However, the latter has been accomplished with a plug device of the European type only to a degree, which primarily is due to the physical size of the converting circuit which previously tended to be large and bulky.

Today, most low-power AC/DC adapters use a technology of the linear type. The linear type converter consists of a transformer for reducing the voltage to an appropriate level, optionally 1 or 4 diodes for rectifying the voltage and a capacitor for smoothening the voltage. Optionally, there may be one or more components for limiting the maximum output voltage. Most of the components are passive, leading to the quality of the output voltage being dependent on the load. This also leads to a degree of over-compensation by making the components large. The use of a transformer also provides a galvanic separation between the input voltage and the output voltage. It is also the linear type converter which, on most occasions, has been used to make AC/DC adapters with a plug-like shape fitting into a wall socket to be used with electronic equipment such as mobile phones and the like.

U.S. Pat. No. 4,273,406 describe an AC/DC adapter accommodated within a plug device. In this adapter, a linear type transformer is received in a two-part cylindrical casing fastened with a screw. There are several drawbacks of said invention due to its application of a large linear type transformer. The most severe drawback is that the casing is large and heavy. Furthermore, the plug is not easily fitted into the European type sockets.

Similarly, EP 0493080 describes a plug with a linear type transformer. The plug device is used especially for medical equipment and hence a very special configuration of the input connectors (coding of plug and socket) is used. However, the input connectors are easily adapted for the European type sockets. The only difference between EP 0493080 and U.S. Pat. No. 4,273,406 is that the plug device is “long and thin” instead of “short and fat” due to the internal arrangement of the components. Even though several plugs may easily fit in sockets arranged closely together, the volume of the plug is not changed in any significant degree.

WO 01/08270 describes an AC/DC adapter of a type similar to U.S. Pat. No. 4,273,406. The invention according to WO 01/08270 fits into the European type sockets. However, this is achieved by having a section with the input connectors adapted for insertion into the socket. The remaining components are housed in a large compartment attached to this section.

Today, the converting circuit technology for AC/DC adapters also uses other newer types of converters which employ high-frequency switching technology. The switching technology provides many benefits over the linear type. These include size, weight and efficiency. It is also possible to manufacture AC/DC adapters which have ‘universal’ input, meaning that the adapter may work with many different voltages and voltage ranges, e.g. ranging voltages from 80V to 250V and frequencies ranging from 40 Hz to 70 Hz.

However, despite the obvious advantages of switch mode technology, even today the old-fashion linear power supply still dominates the market for AC/DC adapters with a wattage below 10 watts (ref: U.S. Pat. No. 5,469,334). The reason is that the manufacturing cost of a SMPS adapter is still considerably higher than for a comparable linear power supply in the same wattage class. The linear power supplies are also produced in very high numbers making manufacturing costs low.

Keeping the production costs in mind combined with today’s design of switch mode power supplies-which is usually less than half the size of a linear adapter-it becomes more evident why the switching technology has not yet been employed in a larger number of low wattage AC/DC adapters.

The Flyback converter is a preferred type of SMPS due to its high-frequency transformer, which provides a galvanic separation. Other types of SMPS may also be used. The switching of the transistor is usually controlled by some Pulse Wide Modulation (PWM) which includes some regulator means for stabilizing the voltage.

The sizes of the inductor/transformer and capacitor are based on the required load and the switching frequency of the transistor (energy per cycle). Thus a high frequency results in smaller components because less energy is transferred per cycle.

Of all the above mentioned techniques the Flyback converter is preferred because it provides a galvanic separation between the supply voltage and the output voltage.

The Flyback converter also enables several different output voltages, each galvanically separated from each other. The types of SMPS which do not have a built-in galvanic separation may employ a separation transformer in order to obtain a galvanic separation. However, this solution adds both an extra component and further disadvantages in relation to the linear type of converter.

A plug device was described in "Machine Design" 9,62 (1990). This invention features a SMPS in a mains plug which converts mains AC voltage into low-voltage DC. The invention uses an integrated circuit (IC) which combines a high-voltage MOSFET and a digital circuitry for switching. All electronic components for the adapter are arranged on a single PCB arranged inside a plug,and perpendicular to the two input connectors. The described plug device has a SMPS type AC/DC adapter fitting within the dimensions of a plug device. However, the article provides no solutions to the problems associated with the small size.

WO 94/06177, equivalent to German utility model G 9320893 U1, describes a European type plug with an built-in power supply. The described SMPS is a Flyback converter. However, the publication does not describe how the SMPS can be arranged inside the plug device and at the same time comply with the required standards. WO 94/06177 uses a special carrier plate on which the PCB is mounted.

The PCB features an essential hexagonal shape and fits to the inner contour of the plug device. Furthermore, the PCB is arranged on top of the carrier plate and contains all the components for the adapter.

Prior art AC/DC adapters have not been able to exploit the advantages of the switching technology while at the same time feature a compact design which fits into the Euro-plug for the mains. The two main reasons are that as the dimensions shrink, a new set of problems arrive due to the required primary side to secondary side isolation and problems in relation to EMC arise due to the switching technology.

Several problems within different technical fields will have to be solved simultaneously in order to construct a plug device with small dimensions, preferably of the European type size or even smaller.

One of the problems with this type of SMPS is that the creepage and clearance distances must be approximately 5 mm in order for the product to be approved with the safety standards. One solution is to encapsulate the electronic components using a technology like macro-melt or potting techniques. Macro-melt infuses the plug with a liquid or semi-liquid, which hardens or stays as a semi-liquid and forms insulating barriers between the components. The method allows components to be arranged very closely together. This is an expensive method for insulating the components and it is difficult to guarantee that no air pockets will occur where the liquid separates the primary and secondary circuits. The macro-melt method may also significantly change the way the components dissipate heat.

SUMMARY OF THE PRESENT INVENTION

The objective of the invention is to provide a power supply unit which fits into an plug device, like a European type plug, as a mains adapter. Furthermore, an AC/DC power supply must fulfil the requirements of various safety and EMC regulations as stated in the above mentioned standards in order to be approved. By using isolating barriers it is possible to manufacture a plug device with a built-in adapter of the SMPS type which fits within the dimensions of a European type plug and which at the same time complies with the standards for a device of this type. It is even possible to use standard components. Even a small rise in production costs in relation to other SMPS's marketed today should be avoided if possible as the SMPS AC/DC adapters will compete with the old-fashion linear adapters as well as other AC/DC adapters with SMPS technology. The price will thus be an important factor.

This means that expensive and new components like Oscon capacitors, multi layer ceramic capacitors (MLCC) or tantal capacitors should be avoided if possible. The rule of the thumb with price sensitive electronic products is to use old fashion components which are widely available by several suppliers instead of state-of-the-art technology. The same applies to production technology where standard production machinery is widely available. The use of new technology may, however, benefit the invention and will make it possible to make the AC/DC adapter even smaller or make an AC/DC adapter of similar physical size with higher wattage.

According to a first aspect of the present invention, a power supply unit is provided comprising:

a housing defining a front end and a rear end, a pair of pins for cooperating with a mains supply outlet and extending perpendicularly from a front end wall of the front end of the housing, a low-voltage cord or a low-voltage connector extending from the rear end of the housing, a switch mode power supply circuit including a printed circuit board for the conversion of the mains supply voltage to a low-voltage, the printed circuit board being mounted within the housing oriented substantially parallel with the front end wall having the pins connected to the one side of the printed circuit board and having the low-voltage cord or low-voltage connector connected to the one side or preferably the opposite side of the printed circuit board, and the housing having a cross-sectional configuration between the front end and the rear end, substantially corresponding to and not exceeding the cross-sectional configuration of the front end wall of a Euro-plug according to the EN 50075 standard.

According to the basic teachings of the present invention, the integration of a switch mode power supply circuit into a housing having dimensions not exceeding the dimensions of a Euro plug according to the EN 50075 standard, is obtained by the use of the printed circuit board in a position parallel with the front end wall of the housing as distinct from the prior art integrated power supply units in which the printed circuit boards have been positioned parallel with the pair of pins for establishing conductive connection to the mains supply outlet.

According to a second aspect of the present invention, a power supply unit is provided comprising: a housing defining a front end and a rear end, a pair of pins for co-operating with a mains supply outlet and extending perpendicularly from a front end wall of said front end of said housing, a low-voltage cord or a low-voltage connector extending from said rear end of said housing, a switch mode power supply circuit including a printed circuit board for the conversion of the mains supply voltage to a low-voltage, and said printed circuit board being mounted within said housing oriented substantially parallel with said front end wall having said pins connected to the one side of said printed circuit board and having said low-voltage cord or low-voltage connector connected to said one side or preferably the opposite side of said printed circuit board.

According to the presently preferred embodiment of the power supply unit according to the present invention, the switch mode power supply circuit including a first rectifier or mains supply rectifier for receiving the mains supply voltage and for converting the mains supply voltage into a first DC voltage to be output from a pair of outputs of the first rectifier, a first energy reservoir capacitor connected across the outputs of the first rectifier for smoothing the first DC voltage, a high frequency oscillator or high frequency switch having a pair of input terminals for receiving the first DC voltage from the capacitor and for output of a high frequency oscillation voltage from a pair of output terminals to a high frequency transformer for reducing the voltage of the high frequency oscillation into a low transformer output voltage and having a pair of input terminals and a pair of output terminals, the input terminals being connected to the output terminals of the high frequency oscillator, the output terminals of the high frequency transformer being connected to a further rectifier for rectifying the low transformer output voltage and having a pair of rectifier outputs for connection to a further energy reservoir capacity connected to the low-voltage cord or the low-voltage connector.

A particular feature of the present invention relates to the provision of contacting the pair of pins to the printed circuit board and according to this particular feature of the present invention, one of the pins of the pair of pins for establishing electrical conductive connection to the mains supply outlet is connected through a fuse, preferably constituted by a resistor to the printed circuit board including the switch mode power supply circuit.

According to a further feature, the other pin is connected to the printed circuit board through a spring loaded contact to establishing electrical conductive connection from the pin to the switch mode power supply circuit.

A particular aspect of the present invention relates to the above described isolating problems and according to the teachings of the present invention the high frequency transformer is positioned between the two capacitors on the printed circuit board facing away from the pair of pins.

The standards require that the high-voltage side and the low-voltage side be separated in a way that prevents accidental discharges between the high-voltage side and the low-voltage side. As mentioned in IEC 60950, this requires a specified minimum of distance through air and through isolation between these sides. By inserting an isolating barrier between the high-frequency transformer and the low-voltage capacitors, the required distance between the two components becomes smaller.

Another consideration is creepage. Creepage is when the electrical charge creeps over the surface of an insulator and thus moves an electrical charge to an unintended position. Arranging the first isolating barrier between the high-frequency transformer and the low-voltage capacitor thus increase the surface distance between said high-frequency transformer and said low-voltage capacitor and reduces creepage distance.

As mentioned above, several different topologies for SMPS's exist. To be able to fit an SMPS within the dimensions of a plug, a number of design features must be contemplated. The preferred SMPS topology is the Flyback converter, but many if not most considerations regarding isolation may be transferred to the other topologies. If for example a Buck-converter is used to control the voltage, a separation transformer may be used to lower the voltage to an appropriate level and to give the galvanic separation.

According to a first preferred embodiment of a plug device according to the invention in which a low-voltage output cord is attached to said plug device and adapted for connecting said plug device to a consumer, the first isolating barrier also extends between said high-frequency transformer and said low-voltage cord. The function of a plug device requires that the built-in adapter is connected to an outside consumer. By extending said first isolating barrier it becomes possible to attach a low-voltage cord to the plug device in positions which otherwise would be too close to the high-voltage side.

According to another preferred embodiment of a plug device according to the invention, a third isolating barrier extends from the housing and into a first slot in the PCB, a fourth isolating barrier extends from said housing and into a second slot in said PCB and the first and second slots are arranged between the high-voltage and low-voltage connection terminals of the high-frequency transformer. By placing isolating barriers between the high-voltage and low-voltage connection terminals, it is possible to arrange them closer together, thus making it possible to use a high-frequency transformer with a more narrow coil form with the connection terminals arranged closer together. Also, by placing said isolating barriers in a slot in said PCB, it is possible to use two-sided PCB's where said high frequency transformer is arranged on said PCB using thru-holes. Thru-holes would otherwise be problematic because the connection terminals extend out from opposite sides of said PCB.

According to another preferred embodiment of a plug device according to the invention, an optocoupler is arranged on said PCB between said first and second slots beneath said high-frequency transformer and on the same side of said PCB as said high-frequency transformer. This allows for the use of an area of said PCB to be occupied by a component, which spans from the high-voltage side to the low-voltage side similar to the high-frequency transformer. If said OPTOCOUPLER was not arranged beneath the high-frequency transformer, it would have to occupy another part of the PCB. Thus the above arrangement saves space on the PCB making the required space on the PCB smaller.

According to another preferred embodiment of a plug device according to the invention, an OPTOCOUPLER is arranged on said PCB between said first and second slots beneath the high-frequency transformer and on the opposite side of said PCB as said high-frequency transformer. This enables the use of a high-frequency transformer of a surface mounted device type (SMD type). The optocoupler functions in the same way with respect to isolation whether it is arranged on the opposite side of the PCB with respect to said high-frequency transformer instead of between the high-voltage side and the low-voltage side. However, it does not save space on the PCB.

According to another preferred embodiment of a plug device according to the invention, a second isolating barrier extends from the housing and between the high-frequency transformer and the PCB and any other components arranged on said PCB beneath or approximately beneath the high-frequency transformer.

Components near or beneath said high-frequency transformer are either on high-voltage potential or low-voltage potential. As mentioned above, the core of the high-frequency transformer has to be regarded as a conducting surface. Placing the second isolating barrier between the high-frequency transformer and the PCB and any other components arranged on said PCB beneath or approximately beneath the high-frequency transformer shields the core of said high-frequency transformer.

According to another preferred embodiment of a plug device according to the invention, a fifth isolating barrier extends from said housing and fully or partially around a fuse component attached between one of said at least two input connectors and said PCB. The fuse component may be connected between said PCB and between either of said input connectors. Depending on the arrangement of said PCB inside said plug device, the fuse component may be too close to the component comprising the SMPS. By arranging said fifth isolating barrier fully or partially around said fuse component, a CLOSER spacing between said fuse component and said components comprising said SMPS is obtained, thus saving space on said PCB. If said fifth isolating barrier and said fuse component furthermore are arranged with an offset with regard to the centreline of said PCB, more space is provided for components on said PCB.

According to another preferred embodiment of a plug device according to the invention, the housing and isolating barriers are moulded as one piece. Moulding said housing and said isolating barriers as one piece gives an easy way of producing said housing with all of said isolating barriers.

According to another preferred embodiment of a plug device according to the invention, said housing comprises two or more separate pieces adapted for attaching each other and forming a larger element. Dividing said housing in two or more pieces makes it easier to close said housing around said PCB and around the components comprising said SMPS. It is also possible to provide a separate element upon which the input connectors are attached. One way of attaching said separate pieces to each other could be by gluing or ultrasonic welding them together.

According to another preferred embodiment of a plug device according to the invention, one or more of the isolating barriers are separate pieces within the housing and attached to or held in place by the housing. By having isolating barriers made separate from the housing, it is possible to use isolating barriers with a complex shape which otherwise would be very difficult to use if they were an integrated part of the housing. Said isolating barriers are attached to said housing, e.g. by the use of glue or by holding them in place e.g. by slots or notches in said housing.

According to another preferred embodiment of a plug device according to the invention, said housing and said isolating barriers are constructed from materials with different properties. By making said isolating barriers from a different material than said housing, it Will be possible to select the isolating properties of the different parts. The housing could have good EMC-SHIELDING properties while said isolating barriers only need good electrical isolating properties.

According to another preferred embodiment of a plug device according to the invention, said slots in said PCB extend all the way over said PCB. This makes it possible to produce a high-voltage circuit and a low-voltage circuit and then decide on the individual arrangement afterwards According to another preferred embodiment of a plug device according to the invention, one or more of said isolating barriers are attached to or held in place by said PCB and not said housing. This gives some of the same advantages as when said isolating barriers are held in place by said housing, but it also gives the freedom of arranging a component which needs isolating in a position where it would be difficult to attach said isolating barriers to said housing.

According to another preferred embodiment of a plug device according to the invention, one or more of said isolating barriers are an integrated part of said PCB and not said housing. Some of said isolating barriers, like said third and fourth isolating barriers, could just as well be a part of said PCB. Said PCB has already good electrical insulating properties and could work as an isolating barrier on a custom-made PCB.

According to another preferred embodiment of a plug device according to the invention, one or more of said isolating barriers are attached to or held in place by one of said components on said PCB and not said housing or directly on said PCB which makes it possible to arrange components on said PCB in a way in which it would be difficult to attach said isolating barriers to said PCB or said housing.

According to another preferred embodiment of a plug device according to the invention, a signal transformer is used instead of an optocoupler. The function of said optocoupler is to send a signal from the low-voltage side to the high-voltage side while having a galvanic separation.

According to another preferred embodiment of a plug device according to the invention, the signal transformer is integrated into the high-frequency transformer In this way, only a single magnetic core is used to form a component with a dual purpose and thus saves space.

Placing the PCB perpendicular to the input connectors and perpendicular to the side surface of the plug device gives some advantages and is therefore preferred. This is not a straightforward solution because this orientation results in a smaller PCB surface area than with the other types of orientation. The arrangement of the PCB allows for the use of capacitors of radial type which usually are cylindrical and have both connectors at the same end of the component and therefore occupy a smaller space on the PCB. Capacitors with connectors at each end may also be used but they are less convenient.

Using the above described isolating barriers and with the preferred arrangement of said PCB, it is possible to manufacture a plug device of European type dimensions with a built-in adapter of the SMPS type, which complies with the IEC-STANDARDS for devices of this type. It is also possible to use standard-type capacitors and other components while still remaining within the dimensions of a plug device of a European type.

DRAWINGS

Figure 4:
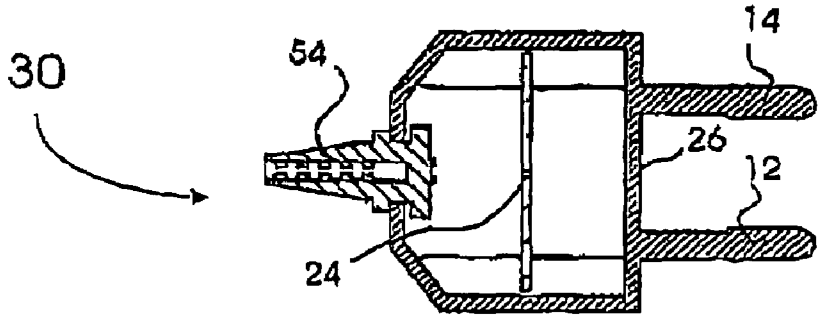
Figure 4:
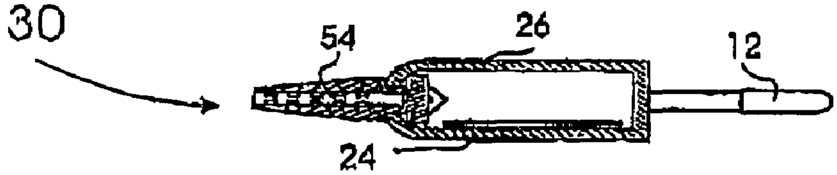
Figure 4:
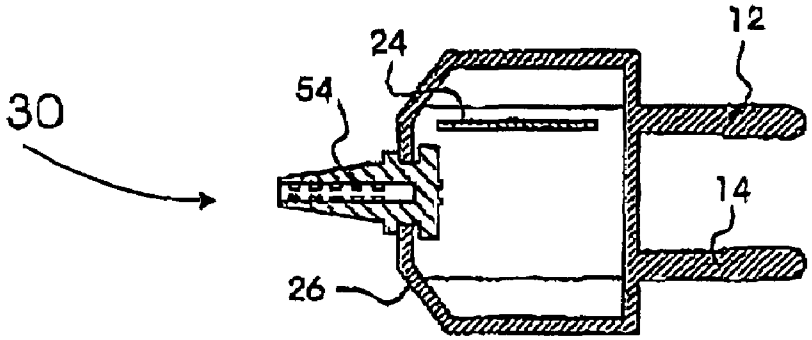

FIG. 4.1 shows a first arrangement of a PCB in a European type plug according to the invention.

FIG. 4.2 shows a second arrangement of a PCB in a European type plug according to the invention.

FIG. 4.3 shows a third arrangement of a PCB in a European type plug according to the invention.

Figure 5:
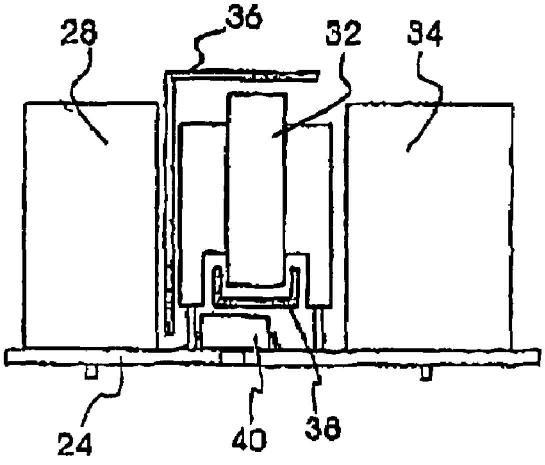

FIG. 5 shows a PCB with the arrangement of the largest components comprising a SMPS according to the invention.

Figure 6:
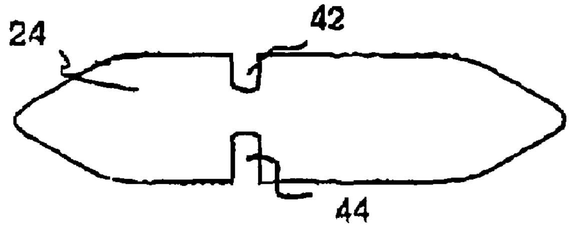

FIG. 6 shows the PCB provided with slots according to the invention.

Figure 7:
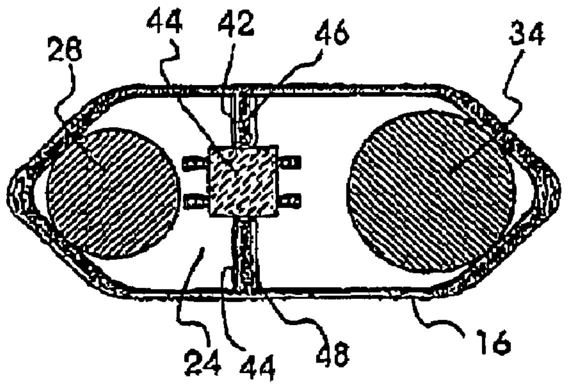

FIG. 7 shows a section view of the PCB with the largest components comprising an SMPS within the housing of the plug device according to the invention.

Figure 8:
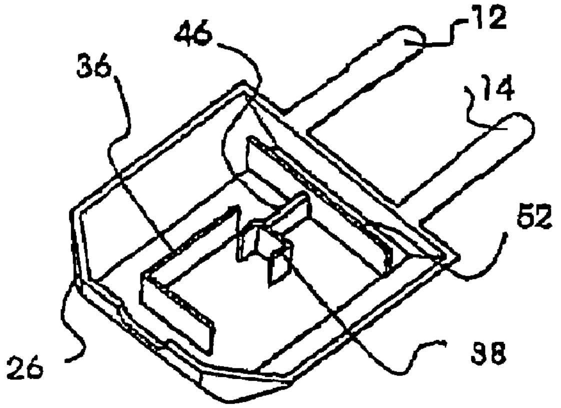

FIG. 8 shows the isolating barriers extending from the housings according to the invention.

Figure 9:
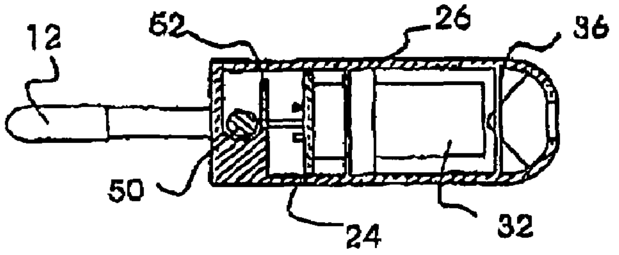

FIG. 9 shows a section view of the input connectors, the fuse component and the isolating barrier for the fuse component according to the invention.

Figure 10:
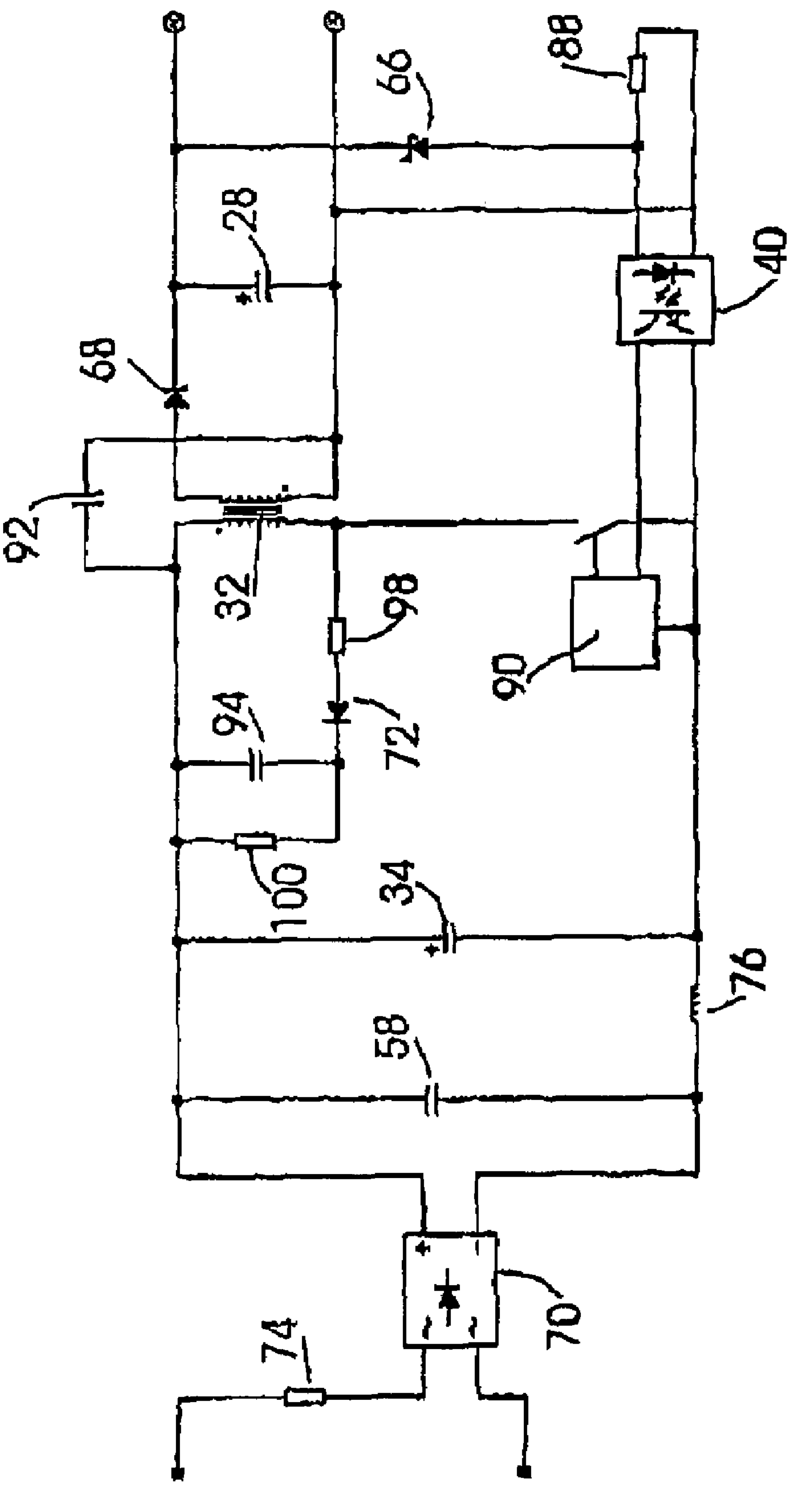

FIG. 10 shows a schematic view of a generic, flyback, switch-mode power supply circuit.

Figure 11:
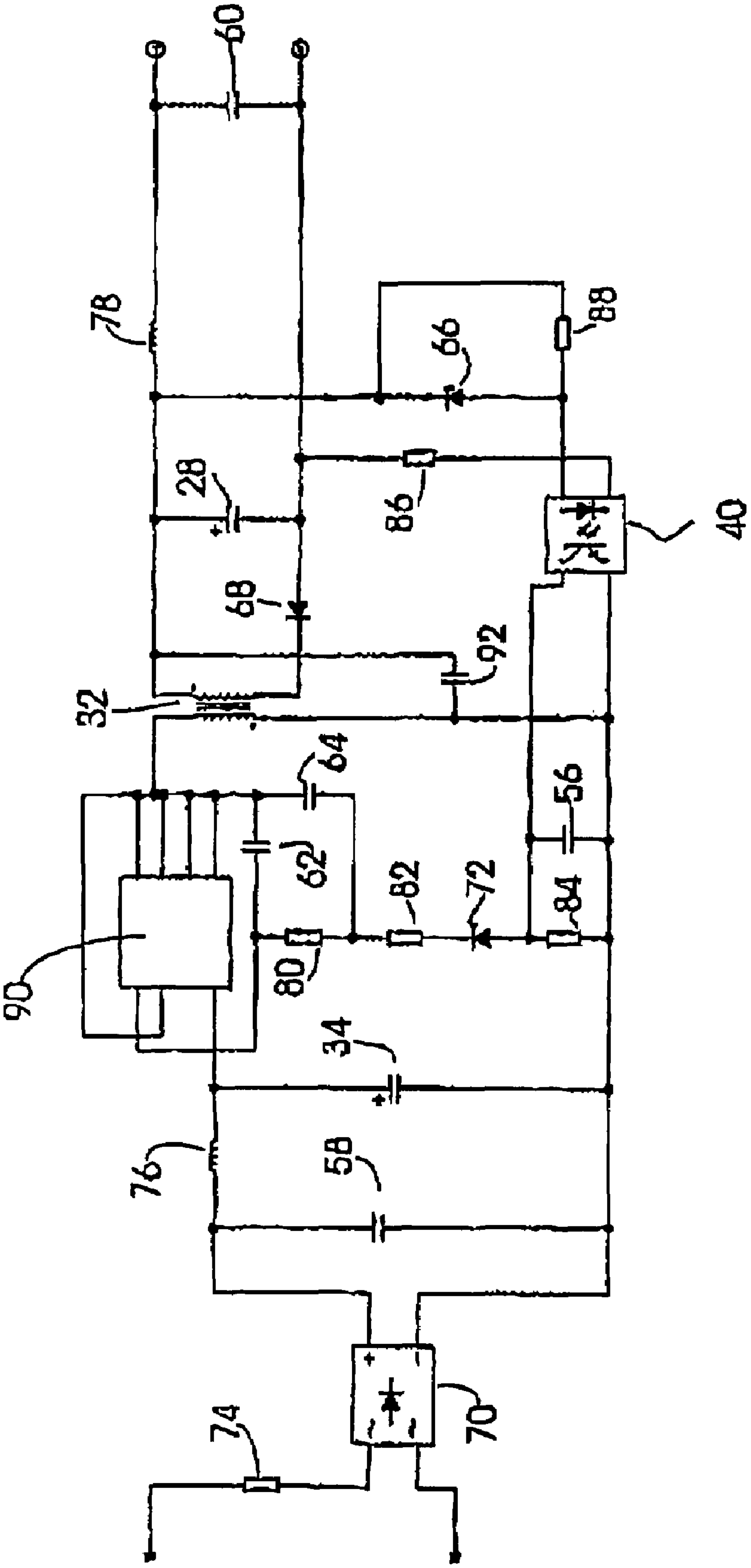

FIG. 11 shows a schematic view of a flyback, switch-mode power supply circuit adapted to deliver 3 W power.

Figure 12:
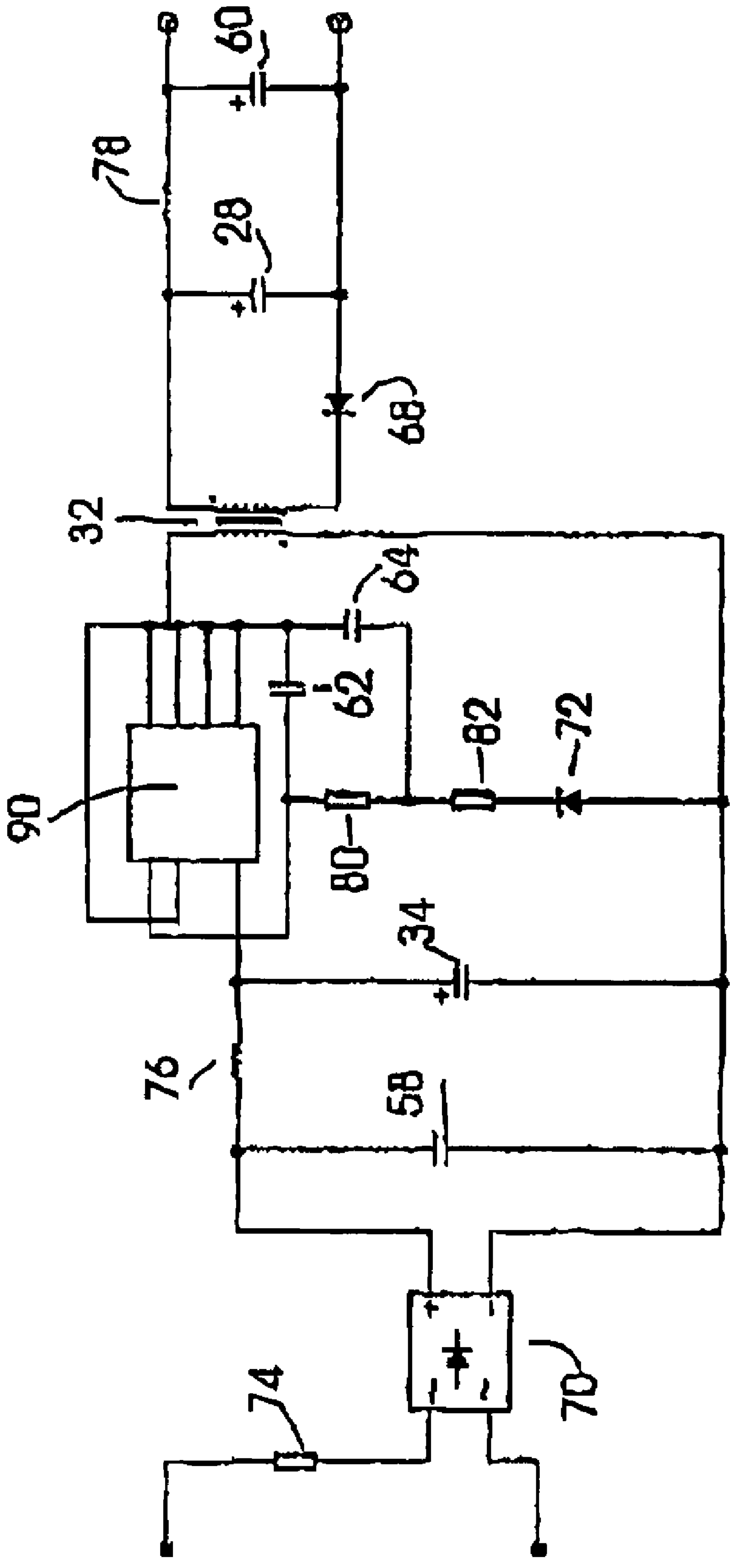

FIG. 12 shows a schematic view of a flyback, switch-mode power supply circuit adapted to deliver 3 W power.

Figure 13:
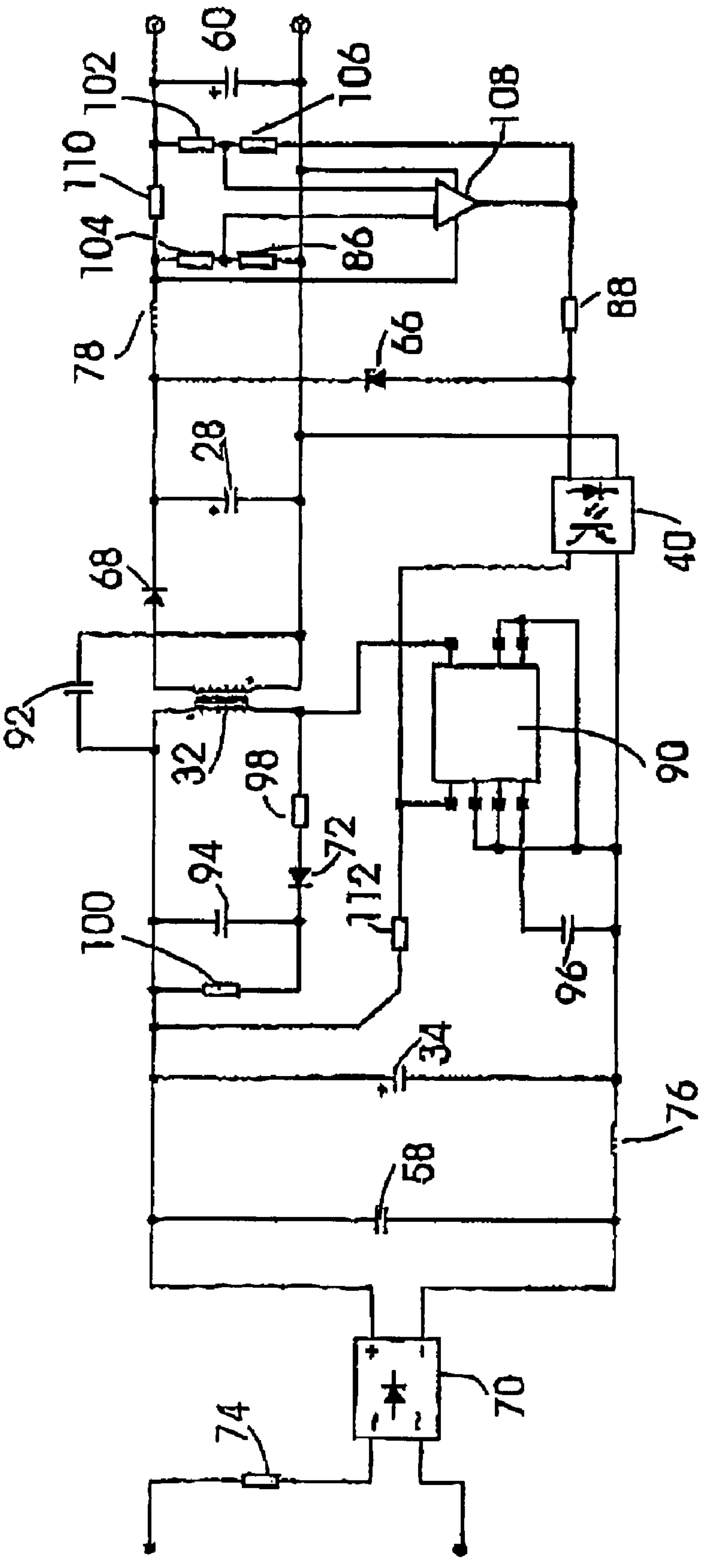

FIG. 13 shows a schematic view of a flyback, switch-mode power supply circuit adapted to deliver 5 W power.

DETAILED DESCRIPTION OF THE EMBODIMENTS

In the following detailed description, the same reference numbers are used for the same components unless otherwise stated.

Figure 1:
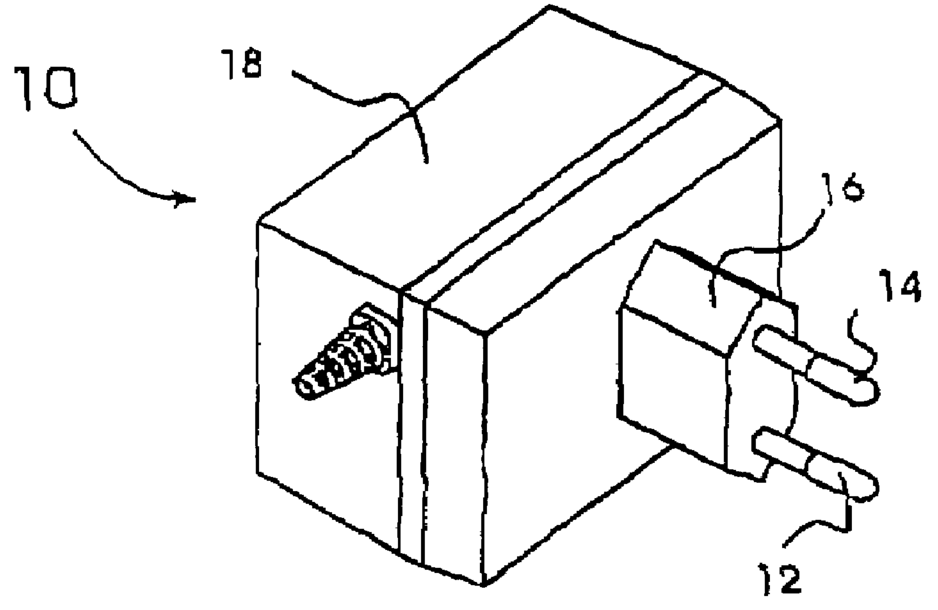
FIG. 1 shows a prior art wall adapter with a linear type adapter.

The prior art wall adapter 10 shown in FIG. 1 is an approximation to most wall adapters used for mobile phones and the like. This wall adapter 10 uses linear technology. Input connectors 12 and 14 are attached to a connecting body 16. The connecting body has the shape of a European-type plug. A main body 18 encloses the transformer, diodes, capacitors and other necessary components. As it appears, the main body 18 of the wall adapter 10 is large and may easily obstruct one or more adjacent wall sockets. In some wall adapters, the main body 18 is offset with regard to the connecting body 16 making it possible to arrange other plugs in one adjacent socket.

Figure 2:
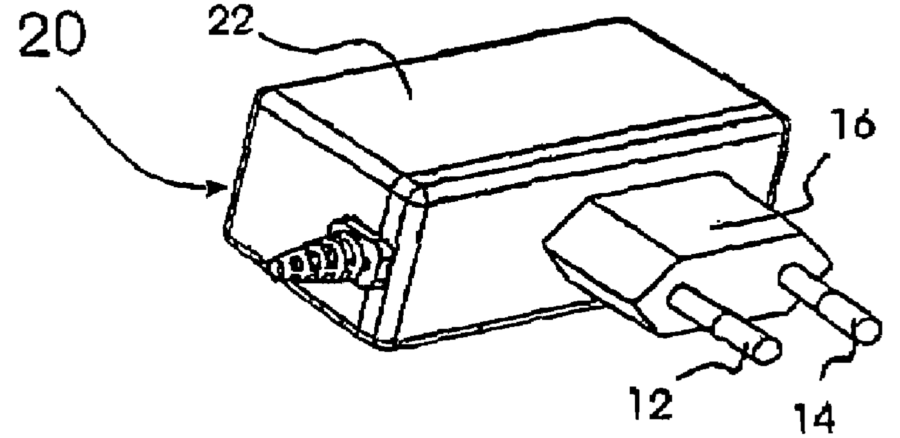
FIG. 2 shows a prior art wall adapter with the SMPS type adapter.

FIG. 2 shows a prior art wall adapter 20 using the SMPS type converting technology.

Figure 3:
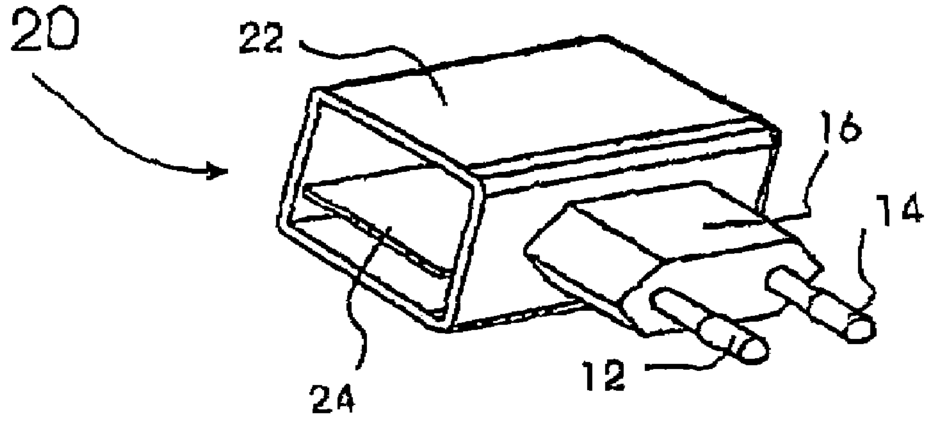
FIG. 3 shows the interior arrangement of the PCB, in a prior art wall adapter with SMPS type adapter.

As with the wall adapter 10 shown in FIG. 1, the input connectors 12 and 14 are attached to a connecting body 16, which has the shape of a European type plug and a main body 22. The SMPS is housed within the main body 22 of the wall adapter 20. All of the components are arranged on a PCB 24 in the main body 22, as shown in FIG. 3, and the input connectors 12 and 14 are connected to the PCB 24 either in the main body 22 or in the connecting body 16 (not shown). The size of the main body 22 using SMPS-technology is usually smaller than the main body 18 of the wall adapter 10 shown in FIG. 1, but is usually still much larger than a European type plug.

As explained above, the invention relates to a plug device of a European type size with a built-in power supply of the SMPS type. A plug device 30 of this type comprises input connectors 12 and 14 attached to a housing 26 of approximately European-type plug size or the size of the connecting body 16 in FIGS. 1 and 2. To be able to arrange a power supply within a plug device of this type, space for a PCB 24 and the components comprising the power supply is required. FIGS. 4.1, 4.2 and 4.3 show three possible orientations of a PCB 24 inside the housing 26 of the plug device 30.

The components that have to be arranged on the PCB 24 can roughly-be divided in two groups: Control components, which generally are small, and power components, which generally are large. These have to be arranged on the PCB 24 in a way which makes the circuit function as intended and at the same time makes it possible to comply with the required standards for isolation and EMC. As shown in FIG. 5, the high-voltage capacitor 34, the high-frequency transformer 32 and the low-voltage capacitor 28 are the LARGEST components and arranged on the same side of the PCB 24 with the capacitors 28 and 34 at each end and the high-frequency transformer 32 in-between. In this way, the PCB 24 is divided into a high-voltage part and a low-voltage part. The high-frequency transformer 32 is arranged closely to the high-voltage capacitor 34 and with a small gap to the low-voltage capacitor 28. The gap between the high-frequency transformer 32 and the low-voltage capacitor 28 thus makes it possible to insert a first isolating barrier 36 between them. The first isolating barrier 36 is in the form of an L so that a leg thereof is able to extend over the top of the high-frequency transformer 32 making it possible to have low-voltage connections over the high-frequency transformer 32 while maintaining the required isolation. Also shown on the figure is the second isolating barrier 38 that extends between the high-frequency transformer 32 and the PCB 24.

In this way, the second isolating barrier 38 shields the optocoupler 40 which is shown arranged beneath or approximately beneath the high-frequency transformer 32 from the conducting surface of the core of the high-frequency transformer 32.

It is the insertion of isolating barriers, which enables the isolation between the high-voltage side and the low-voltage side to meet the requirements of the standards. To accommodate further barriers, two slots 42, 44 are made in PCB 24 as shown in FIG. 6. The slots 42, 44 are made in the PCB 24 at a position between the connectors of the high-frequency transformer 32, thereby dividing the PCB 24 into a high-voltage part and a low-voltage part. The third and fourth barrier walls 46 and 48 inserted into a slot in the PCB 24 thus increases the clearance distance between high-voltage side and low-voltage side. The barriers also help with creepage distance because the surface distance between the high-voltage side and the low-voltage side become longer.

Between the slots 42,44 and beneath the high-frequency transformer 32, the optocoupler 40 is arranged as shown in FIG. 7 and thus the only two components which span the isolation gap between the high-voltage side and the low-voltage side are the high-frequency transformer 32 and the optocoupler 40. It is also possible to arrange the optocoupler 40 on the opposite side of the PCB 24 if it is difficult to arrange it on the same side as the high-frequency transformer 32.

FIG. 8 only shows one half of the housing 26 for greater visibility. There are a number of isolating barriers which extend out from the housing 26. These isolating barriers either form an integrated part of the housing 26 or are attached to the housing 26. The benefit of not attaching the isolating barriers to the housing 26 is that the isolating barriers may be made from a different material than the housing 26 and thus have different isolating properties than the housing 26. The shown isolating barriers correspond to the ones described in connection with FIGS. 5, 6 and 7. The two isolating barriers 36 and 38 may optionally be formed as two shorter isolating barriers that extend from each side of the housing 26 and overlap each other in the middle, thus forming a complete isolating barrier. If the latter is the case, the half of the housing 26 shown in FIG. 8 and the half not shown may form an approximate mirror of each other. Otherwise the only isolating barrier which extends from the half of the housing 26 not shown in FIG. 8 is the fourth isolating barrier 48.

FIG. 9 shows how a fifth isolating barrier 52 is arranged in connection with a fuse component 50. The plug device is shown with the PCB 24 as arranged in FIG. 4.1.

The fuse component 50 is connected between one of the input connectors 12 or 14 and the PCB 24. As it appears, the fifth isolating barrier 52 extends partially around the fuse component 50, thus isolating it from the remaining components comprising the SMPS. Alternatively, the isolating barrier 52 could extend all the way around the fuse component 50. Another alternative is to arrange the fuse component with an offset to the centerline of the PCB 24, thus leaving more room for components to be arranged on the PCB 24 facing the fuse component 50. The housing 26 further has a low-voltage output cord with an attached strain relief 54.

In FIG. 10 a schematic view of a generic, flyback, switch-mode power supply circuit is shown. The circuit comprises a safety fuse, a rectifier, an energy reservoir filter section, a clamp circuit section, a transformer, a switch controller, a safety capacitor, a feed-back opto-coupler, a rectifier section and a secondary energy reservoir capacity.

FIGS. 11,12 and 13 are schematic views of three prototypes of the generic flyback, switch-mode power supply circuit of FIG. 10 adapted to deliver 3.3 and 5 watts output, respectively. FIGS. 11 and 13 illustrates optocoupler feedback-based, flyback, switch-mode power supply circuits. FIG. 12 illustrates a transformer feedback-based flyback switch-mode power supply circuit. The components used to assemble the prototypes are listed in example 1, 2 and 3.

In the description of the invention a European-type plug has been used as an example, however, the invention may easily be adapted for e.g. use with different shaped input connectors, like American or British plug devices.

The invention has been described where an SMPS is build into a plug device.

However, as the invention relates to an SMPS with small dimensions, it is possible to make a number of changes while remaining within the idea of the invention. As an example, it is possible to attach a second set of connectors to the housing as the low-voltage output. The plug device could then fit into a socket on, e.g. a PCB or in a device and thus act as a low-voltage supply. Another example is when the input connectors are adapted for other kinds of connections and the plug device may act as the power supply in devices such as shavers, light bulbs, bicycle lamps and the like.

EXAMPLE 1

In a prototype implementation of the power supply circuit shown in 11, the following elements and components were used.

A capacitor 34, 6, 8 uF, 400V, from Rubycon.
A capacitor 56, MLCC SMD0603, from Phycomp.
A capacitor 28, 1000 uF, 10V, from Luxon.
A capacitor 60, 33 uF, 10V, from Luxon.
A capacitor 58, 56 nF, 1000V, from Johanson.
A capacitor 62, MLCC, SMD0603,220 nF, 50V from AVX.
A capacitor 64, MLCC, SMD1206,100 nF, 100V, from Phycomp.
A zener diode 66, from ON Semiconductor.
A Schottky diode 68, 2A, 40V, 0.3V, 100 pF, from ON Semiconductor
A rectifier bridge 70 from Diotec.
A diode 72, 600 Vrrm, 0.5 A, from Diotec.
A 10 ohm, 2 W, wire wound fusible resistor 74 from Token.
A RF choke 76, 1000 uH, 130 mA, from Epcos.
A chip Inductor 78, 1 uH, 1000 mA, from Murata.
An optocoupler 40, from NEC.
Three resistors 80,82, 84, SMD 0603, 0.063W, 50V from Phycomp.
Two resistors 86,88, SMD 0402, 0.05 mW, from Phycomp.
A switch element 90 from Power Integrations.
A transformer 32, EF12.6, TEX-E wire, custom made.
A capacitor 92, 330 pF, 250V, 4000V, from BC components.
A 1 mm thick, 2-layer PCB, custom made.
A bottom plastic casing, weighing 2.8 gram, custom made.
A top plastic casing, weighing 2.9 grams, custom made.
Two brass pins, each weighing 1.3 grams.
A low profile spring loaded contact, from Preci Dip.

EXAMPLE 2

The above-mentioned components may also be assembled to form a transformer-based flyback switch-mode power supply circuit, omitting some components from the listing in example 1. In FIG. 12 the reference numerals refer to the components listed in example 1.

EXAMPLE 3

In a prototype implementation of the power supply circuit shown in 13, the following elements and components were used.

A capacitor 34, 6, 8 uF, 400V, from Rubycon.
A capacitor 94, MLCC, 1 nF, 200V, X7R, from AVX.
A capacitor 96, MLCC, 100 nF, 50V, from Phycomp.
A capacitor 28, 1000 uF, 10V, from Luxon.
A capacitor 60, 33 uF, 10V, from Luxon.
A capacitor 58, 56 uF, 1000V, from Johanson.
A zener diode 66, from ON Semiconductor.
A Schottky diode 68, 2A, 40V, 0.3V, 100 pF, from ON Semiconductor.
A rectifier bridge 70 from Diotec.
A diode 72,600 Vrrm, 0.5 A, from Diotec.
A 10 ohm, 2 W, wire wound fusible resistor 74 from Token.
A RF choke 76, 1000 uH, 130 mA, from Epcos.
A chip Inductor 78, 1 uH, 1000 mA, from Murata.
An optocoupler 40, from NEC.
Two resistors 98, 100 SMD 0805,0.125 W, 150V from Phycomp.
Five resistors 86,88, 102,104, 106, SMD 0402, 0.05 mW, from Phycomp.
A switch element 90 from Power Integrations.
A transformer 32, EF12.6, TEX-E wire, custom made
A capacitor 92, 330 pF, 250V, 4000V, from BC components.
An operations amplifier 108, 0.9-7 V, from ON Semiconductor.
A resistor 112, 2M Ohm.
A resistor 110, 0, 047 Ohm.
A 1 mm thick, 2-layer PCB, custom made.
A bottom plastic casing, weighing 2.8 gram, custom made.

A top plastic casing, weighing 2.9 grams, custom made,
Two brass pins, each weighing 1.3 grams.
A low profile spring loaded contact, from Preci Dip.

The invention is further characterised by the following points.

1. Plug device with a built-in power supply of the switch mode power supply type comprising a printed circuit board (244) upon which a high-frequency transformer (32), a low-voltage capacitor (28) and other components are arranged, said device further comprising a housing (26) and at least two input connectors (12,14) adapted for insertion into a wall socket characterised in that a first isolating barrier (36) extends from said housing (26) in between said high-frequency transformer (32) and said low-voltage capacitor (28).
2. Plug device according to point 1 upon which a low-voltage output cord (54) is attached and adapted for connecting said plug device to a consumer, characterised in that said first isolating barrier (36) also extends between said high-frequency transformer (32) and said low-voltage cord (54).
3. Plug device according to point 1 characterised in that a third isolating barrier (46) extends from said housing (26) and into a first slot (42) in t!he said printed circuit board (24) and a fourth isolating barrier (48) extends from said housing (26) and into a second slot (44) in said printed circuit board (24) and that said first and second slots (42,44) are arranged between the high-voltage and low-voltage connection terminals of said high-frequency transformer (32).
4. Plug device according to point 1 CHARACTERISED in that an optocoupler (40) is arranged on said printed circuit board (24) between said first and second slots (42,44) beneath said high-frequency transformer (32) and on the same side of said printed circuit board (24) as said high-frequency transformer (32),.
5. Plug device according to point 1 characterised in that an optocoupler (40) is arranged on said printed circuit board (24) between said first and second slots (42,44) beneath said high-frequency transformer (32) and on the opposite side of said printed circuit board (24) as said high-frequency transformer (32).
6. Plug device according to point 1, 4 or 5 characterised in that a second isolating barrier (38) extends from said housing (26) and between said high-frequency transformer (32) and said printed circuit board (24) and any other components arranges on said printed circuit board (24) beneath or approximately beneath said high-frequency transformer (32).
7. Plug device according to any of the preceding claims upon which a fuse component (50) is attached between one of said at least two input connectors (12,14) and said printed circuit board (24) characterised in that a fifth isolating barrier (52) extends from said housing (26) and fully or partially around said fuse component (50).
8. Plug device according to any of the preceding claims characterised in that said housing (26) and said isolating barriers (36,38, 46,48, 52) are moulded as one piece.
9. Plug device according to any of the preceding claims characterised in that said housing (26) is comprised of two or more separate pieces adapted for attaching each other and forming a larger element.
10. Plug device according to point 9 characterised in that one or more of said isolating barriers (36,38, 46,48, 52) are separate pieces from said housing (26) and attached to or held in place by said housing (26).
11. Plug device according to point 10 characterised in that said housing (26) and said isolating barriers (36,38, 46,48, 52) are constructed from materials with different material properties.
12. Plug device according to point 3, 4 or 5 characterised in that said slots (42,44) in said printed circuit board (24) extends all the way over said printed circuit board (24) dividing it in two parts.
13. Plug device according to any of the preceding claims characterised in that one or more of said isolating barriers (36,38, 46,48, 52) are attached to or held in place by said printed circuit board (24) and not said housing (26).
14. Plug device according to any of the preceding claims characterised in that one or more of said isolating barriers (36,38, 46,48, 52) are an integrated part of said printed circuit board (24) and not said housing (26).
15. Plug device according to any of the preceding claims characterised in that one or more of said isolating barriers (36,38, 46,48, 52) are attached to or held in place by one of the components on said printed circuit board (24) and not said housing (26) or said printed circuit board (24). 16. Plug device according to any of the preceding claims characterised in that a signal transformer is used instead of an optocoupler.
17. Plug device according to point 15 CHARACTERISED in that said signal transformer is integrated into said high-frequency transformer (32).

The invention claimed is:

1. A power supply unit comprising:

a housing defining a front end and a rear end, a pair of pins for co-operating with a mains supply outlet and extending perpendicularly from a front end wall of said front end of said housing, a low-voltage cord or a low-voltage connector extending from said rear end of said housing, a switch mode power supply circuit including a printed circuit board for the conversion of the mains supply voltage to a low-voltage, said printed circuit board being mounted within said housing oriented substantially parallel with said front end wall having said pins connected to the one side of said printed circuit board and having said low-voltage cord or low-voltage connector connected to said one side or preferably the opposite side of said printed circuit board, and said housing having a cross-sectional configuration between said front end and said rear end, wherein said cross-sectional configuration is a hexagon and the beeline distance between the two longer parallel sides of said hexagon is not more than 13.7±0.7 mm. and the beeline distance between the two points of two acute angle of said hexagon is not more than 35.3±0.7 mm.

2. The power supply unit according to claim 1, said switch mode power supply circuit including a first rectifier or mains supply rectifier for receiving said mains supply voltage and for converting said mains supply voltage into a first DC voltage to be output from a pair of outputs of said first rectifier, a first energy reservoir capacitor connected across said outputs of said first rectifier for smoothing said first DC voltage, a high frequency oscillator or high frequency switch having a pair of input terminals for receiving said first DC voltage from said energy reservoir capacitor and for output of a high frequency oscillation voltage from a pair of output terminals to a high frequency transformer for reducing the voltage of said high frequency oscillation into a low transformer output voltage and having a pair of input terminals and a pair of output terminals, said input terminals being connected to said output terminals of said high frequency oscillator or high frequency switch, said output terminals of said high frequency transformer being connected to a further rectifier for rectifying said transformer output voltage and having a pair of rectifier outputs for connection to a further energy reservoir capacity connected to said low-voltage cord or said low-voltage connector.

3. The power supply unit according to claim 1, said switch mode power supply circuit further including an input fuse establishing connection from one of said pins to said printed circuit board.

4. The power supply unit according to claim 1, one of said pins being connected to a spring bias contact element of said printed circuit board for establishing electrical conductive connection from said pin to said switch mode power supply circuit.

5. The power supply unit according to claim 1, said housing further having a first inwardly protruding isolating barrier extending from said housing into an inner space defined within said housing and in between said high frequency transformer and said low-voltage capacitor.

6. The power supply unit according to claim 5, said first isolating barrier further extending in between said high frequency transformer and said low-voltage cord or low-voltage connector.

7. The power supply unit according to claim 5, said housing including a further inwardly protruding isolating barrier extending into said inner space defined within said housing and into a slot in said printed circuit board.

8. The power supply unit according to claim 1, said isolating barrier or isolating barriers being integrally moulded with said housing, or alternatively, said housing being filled out with an isolating filling substance.

9. The power supply unit according to claim 1, said printed circuit board having one or more through-going apertures partly or completely dividing said printed circuit board into two or more parts.

10. The power supply unit according to claim 2, said high frequency transformer being positioned between said capacitors on said printed circuit board facing away from said pair of pins.

* * * * *

UNITED STATES PATENT AND TRADEMARK OFFICE

CERTIFICATE OF CORRECTION

PATENT NO. : 7,259,975 B2
APPLICATION NO. : 10/513010
DATED : August 21, 2007
INVENTOR(S) : Pedersen et al.

It is certified that error appears in the above-identified patent and that said Letters Patent is hereby corrected as shown below:

On title page item (73) Assignees:
Change "Microlead Technology Ltd., Hong (CN); Microlead International Limited, Totola (GB)"
To -- "Mirolead International Limited, Totla (GB) --

Item (57) ABSTRACT, Line 6:
Change "isolating barrier extends form the housing in between the"
To -- isolating barrier extends from the housing in between the--

Item (57) ABSTRACT, Line 8:
Change "A third isolating barrier extends form the housing and into"
To --A third isolating barrier extends from the housing and into--

Col. 14, line 51, change "mm. " to --mm, --.

Signed and Sealed this

Twentieth Day of November, 2007

JON W. DUDAS
*Director of the United States Patent and Trademark Office*